(12) United States Patent
Murakami

(10) Patent No.: US 7,080,438 B2
(45) Date of Patent: Jul. 25, 2006

(54) JUNCTION METHOD AND JUNCTION TOOL

(75) Inventor: Kotoyoshi Murakami, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 21 days.

(21) Appl. No.: 10/623,807

(22) Filed: Jul. 22, 2003

(65) Prior Publication Data
US 2004/0134058 A1 Jul. 15, 2004

(30) Foreign Application Priority Data
Jul. 31, 2002 (JP) .............................. 2002-223594

(51) Int. Cl.
*B21D 39/03* (2006.01)
*B23K 20/12* (2006.01)

(52) U.S. Cl. ............................ 29/428; 29/446; 29/447; 29/514; 29/521; 72/67; 228/2.1; 228/112.1

(58) Field of Classification Search ................. 29/428, 29/446, 447, 505, 514, 521, 33 K, 33 A, 29/33 R, 509, 522.1; 228/2.1, 112.1; 72/67
See application file for complete search history.

(56) References Cited

U.S. PATENT DOCUMENTS

| | | | | |
|---|---|---|---|---|
| 5,230,136 A | * | 7/1993 | Cronn et al. ............... | 29/521 |
| 5,408,735 A | * | 4/1995 | Schleicher ................ | 29/432.2 |
| 5,460,317 A | * | 10/1995 | Thomas et al. ............ | 228/112.1 |
| 5,893,507 A | * | 4/1999 | Ding et al. ................ | 228/2.1 |
| 6,045,027 A | * | 4/2000 | Rosen et al. .............. | 228/112.1 |
| 6,050,474 A | * | 4/2000 | Aota et al. ................ | 228/112.1 |
| 6,050,475 A | * | 4/2000 | Kinton et al. ............. | 228/112.1 |
| 6,053,391 A | * | 4/2000 | Heideman et al. .......... | 228/2.1 |
| 6,170,731 B1 | * | 1/2001 | Hofius et al. .............. | 228/2.1 |
| 6,247,633 B1 | * | 6/2001 | White et al. .............. | 228/112.1 |
| 6,299,050 B1 | * | 10/2001 | Okamura et al. ........... | 228/110.1 |
| 6,302,315 B1 | * | 10/2001 | Thompson ................. | 228/112.1 |
| 6,325,273 B1 | * | 12/2001 | Boon et al. ............... | 228/112.1 |
| 6,460,752 B1 | * | 10/2002 | Waldron et al. ........... | 228/112.1 |
| 6,473,957 B1 | * | 11/2002 | Voelkner et al. ........... | 29/505 |

(Continued)

FOREIGN PATENT DOCUMENTS

DE 197 31 638 A1 1/1999

(Continued)

OTHER PUBLICATIONS

On-line translation of JP 2002-066760 A.*

(Continued)

*Primary Examiner*—Essama Omgba
(74) *Attorney, Agent, or Firm*—Nixon Peabody LLP; Donald R. Studebaker

(57) ABSTRACT

While at least one of first and second tools 4 and 5 of a junction tool 6 is rotated, a workpiece W made of a plurality of plate materials W1 and W2 superimposed in their thickness directions is nipped between the first and second tools and joined at points. The first tool 4 is provided with a pin 44 protruding from its distal end surface 43 along a junction axis X. The second tool 5 is provided with a depression 51 which is depressed at its distal end surface 53 along the junction axis X. By the first pin 44 of the first tool 4 and the depression 51 of the second tool 5, the superimposed surface W3 of the softened workpiece W is caulked in the direction of the junction axis X. Further, plastic flow is generated within the workpiece W so as to agitate the vicinity of the superimposed surface W3.

12 Claims, 10 Drawing Sheets

U.S. PATENT DOCUMENTS

| | | | |
|---|---|---|---|
| 6,536,651 B1 * | 3/2003 | Ezumi et al. | 228/112.1 |
| 6,585,443 B1 * | 7/2003 | Aota et al. | 403/270 |
| 6,601,751 B1 * | 8/2003 | Iwashita | 228/112.1 |
| 6,604,667 B1 * | 8/2003 | Schilling et al. | 228/2.1 |
| 6,651,300 B1 * | 11/2003 | Muller | 29/243.5 |
| 6,722,013 B1 * | 4/2004 | Rapp | 29/521 |
| 6,722,556 B1 * | 4/2004 | Schilling et al. | 228/112.1 |
| 6,789,722 B1 * | 9/2004 | Murakami | 228/112.1 |
| 6,915,939 B1 * | 7/2005 | Hashimoto et al. | 228/2.1 |
| 6,994,242 B1 * | 2/2006 | Fuller et al. | 228/112.1 |
| 2001/0045447 A1 | 11/2001 | Kano et al. | |
| 2002/0014516 A1 | 2/2002 | Nelson et al. | |
| 2003/0029903 A1 * | 2/2003 | Kashiki et al. | 228/112.1 |
| 2003/0201307 A1 * | 10/2003 | Waldron et al. | 228/112.1 |
| 2004/0144830 A1 * | 7/2004 | Murakami | 228/112.1 |

FOREIGN PATENT DOCUMENTS

| | | |
|---|---|---|
| EP | 1 153 694 A2 | 11/2001 |
| EP | 1 281 468 A2 | 2/2003 |
| JP | 09-508073 | 8/1997 |
| JP | 2001-259863 A | 9/2001 |
| JP | 2001-314982 | 11/2001 |
| JP | 2002-066760 A | 3/2002 |

OTHER PUBLICATIONS

Feb. 15, 2005 Notice of Reasons of Rejection from Japanese Patent Office for Patent Application No. JP-2002-223594.

* cited by examiner

JUNCTION METHOD AND JUNCTION TOOL

BACKGROUND OF THE INVENTION

The present invention relates to a junction method for joining a plurality of plate materials superimposed in their thickness directions at points and a junction tool used for the junction method.

A resistance welding method and a mechanical fastening method by rivets have been conventionally known as a method for joining a workpiece formed of a plurality of plate materials superimposed in their thickness directions at points.

The resistance welding method has drawbacks in view of running cost and quality control. Namely, the resistance welding method requires a power source with large capacity at the time of junction. A welding electrode has a short lifetime because of contamination or wear. Further, equipment for supplying cooling water is required in order to cool the electrode.

The mechanical fastening method by rivets has problems in that it requires a large number of rivet materials and such rivets lead to an increase in the weight of the resultant joined material.

A friction agitation junction method has been known as a method for joining a workpiece at points (see Japanese Patent Application Laid-Open (JP-A) No. 2001-314982). In accordance with this method, junction is performed for a workpiece by using a junction tool configured by a first tool which includes a pin protruding from its distal end surface and a second tool which has a flat distal end surface.

Specifically, in accordance with the friction agitation junction method, while the first tool is rotated, the workpiece is nipped by the junction tool and pressed. Then, the pin of the first tool is sunk into the workpiece.

Then, the workpiece is softened by a friction heat generated by the rotation of the first tool and the first tool is even further sunk into the workpiece. Further, plastic flow is generated within the workpiece by the rotation of the first tool. The vicinity of the superimposed surface of the workpiece (i.e., surface at which adjacent two plate materials contact) is agitated by the plastic flow.

After the agitation is sufficiently performed within the workpiece as described above, the first tool is pulled from the workpiece and the softened plate materials are cured. As a result, a plurality of plate materials are joined at points.

Unlike the resistance welding method, in accordance with the friction agitation junction method, plate materials can be joined with a small capacity of power and equipment for supplying a cooling water is not required. Further, as a contamination or a wear does not occur in a junction tool, the tool can be used for a long time without maintenances. Thus, advantages such as a reduction in a running cost and an easy maintenance can be obtained.

Moreover, unlike the mechanical fastening method by rivets, the friction agitation junction method has advantages that an increase in cost caused by rivet materials and an increase in the weight of the resultant joined material do not occur.

In order to improve a junction strength in the friction agitation junction method, the amount of sinking of the first tool into the workpiece must be relatively increased and the range that plastic flow occurs within the workpiece (plastic flow range) must be expanded.

In accordance with the friction agitation junction method, however, the thickness of the workpiece (plate material) is reduced by the amount that the first tool is sunk into the workpiece. Thus, when the amount of sinking of the first tool into the workpiece becomes large, the thickness of the plate material itself is significantly reduced, resulting in a decrease in the strength of the plate material itself. For this reason, there arises a problem in that although a junction strength is improved by sufficiently agitating the workpiece, the strength of the plate material is decreased, so that the strength of the junction portion is decreased.

In accordance with the friction agitation junction method, the distal end (pin) of the first tool must be sunk into the vicinity of the superimposed surface of the workpiece. For this reason, when the thickness of a plate material to be joined is large, the distance between the surface of the workpiece and the superimposed surface is long, so that the amount of sinking of the first tool must be increased. Thus, as described above, the thickness of the plate material is significantly reduced, resulting in a decrease in the strength of the plate material itself. When the thickness of the plate material is large, a radiation capacity becomes large and thus plastic flow hardly occurs within the workpiece. Thus, the workpiece cannot be sufficiently agitated and a junction strength is decreased. In this way, in accordance with the conventional friction agitation junction method, a certain constraint about the thickness of joinable plate materials exists.

The friction agitation junction method is suitable for joining relatively soft plate materials made of, e.g., aluminum alloys. Nevertheless, the tensile characteristics (tensile strength and proof stress) of a 5000 series alloy (Al—Mg) at high temperatures are significantly different from those of a 6000 series alloy (Al—Mg—Si). Thus, when plate materials made of a 6000 series aluminum alloy with relatively low strength are joined, a sufficient junction strength can be obtained. On the other hand, in the case where plate materials made of a 5000 series aluminum alloy with relatively high strength are joined, a sufficient junction strength cannot be obtained because a workpiece is hardly agitated. As described above, a certain constraint about joinable plate materials exists in a conventional friction agitation junction method.

SUMMARY OF THE INVENTION

The present invention was developed in view of the above-described circumstances and an object of the present invention is to improve a strength of the junction portion in a junction method for joining a workpiece made of a plurality of plate materials superimposed in their thickness directions at points, to enable junction of the workpiece without constraints about thicknesses and materials of plate materials and to provide a junction tool which is suitable for the junction method.

A junction method of the present invention is a method for joining a workpiece made of a plurality of plate materials superimposed in their thickness directions at points.

In accordance with the junction method, the junction method utilizes a junction tool which is configured by first and second tools placed on a junction axis substantially perpendicular to the superimposed surface of the workpiece while nipping the workpiece therebetween and which has a pin protruding from the distal end surface of the first tool along the junction axis and a depression depressed at the distal end surface of the second tool along the junction axis. Further, the junction method comprises a first step of nipping the workpiece with the junction tool in the direction of the junction axis and pressing the same while rotating one or both of the first and second tools about the junction axis so as to sink the distal end portion of the junction tool into the workpiece; a second step of caulking, in the direction of the junction axis, the superimposed surface of the workpiece softened by a friction heat generated by the rotation of the junction tool by the pin of the first tool and the depression of the second tool; a third step of generating plastic flow within the workpiece by the rotation of the junction tool so as to agitate the vicinity of the superimposed surface of the workpiece; and a fourth step of pulling the junction tool from the workpiece.

Because of such structure, in the first step, while at least one of the first and second tools is being rotated about the junction axis, the workpiece is nipped by the junction tool in the direction of the junction axis and then pressed. Then, the distal end portion of the junction tool is sunk into the workpiece. Namely, the distal end portion of the workpiece is press-fitted into the workpiece.

Subsequently, in the second step, the workpiece is softened by a friction heat generated by the rotation of the junction tool and thus the junction tool is even further sunk into the workpiece. As a result, the pin of the first tool presses the softened workpiece into the depression of the second tool, so that the superimposed surface of the workpiece is caulked in the direction of the junction axis.

In the third step, plastic flow occurs within the workpiece by the rotation of the junction tool sunk into the workpiece. In this way, the vicinity of the superimposed surface of the workpiece is agitated and thus a plurality of plate materials are united.

In the fourth step, the junction tool sunk into the workpiece is pulled therefrom. The workpiece is cooled and cured and then the junction for the workpiece is completed.

A junction tool used for a conventional friction agitation junction method has only a pin. Thus, a workpiece is only agitated. Plastic flow generated within the workpiece at that time is mainly a flow along the superimposed surface of the workpiece.

The junction tool used for the junction method of the present invention has a pin and a depression opposing the pin. For this reason, as described above, as well as the workpiece is agitated, the superimposed surface of the workpiece is caulked in the direction of the junction axis.

Because the superimposed surface of the workpiece is caulked in the direction of the junction axis, not only the plastic flow along the superimposed surface of the workpiece but also a plastic flow in the direction of the junction axis occurs within the workpiece. Thus, the workpiece is agitated in the direction along the superimposed surface and the direction perpendicular to the superimposed surface (i.e., the direction of the junction axis), respectively.

In accordance with this junction method, the junction for the workpiece is performed by combining the agitation within the workpiece with the caulking thereof and thus a junction strength is significantly improved as compared to conventional cases.

Further, in accordance with conventional junction methods, agitation within a workpiece is not sufficient in the case of joining thick plate materials or joining plate materials with relatively high strength. Thus, a sufficient junction strength cannot be obtained. On the other hand, in accordance with the junction method of the present invention, even if the agitation within the workpiece is not sufficient, a junction strength is increased by caulking the superimposed surface of the workpiece, and thus a sufficient junction strength can be obtained. Accordingly, in accordance with the junction method of the present invention, junction for a workpiece can be carried out without constraints about thicknesses and materials for plate materials.

A junction tool which has an annular concave groove at the distal end surface of the first tool so as to surround the pin may be used.

Thus, in the second step, as described above, the superimposed surface of the softened workpiece is caulked in the direction from the first tool to the second tool by the pin and the depression of the junction tool.

As the annular concave groove is provided at the distal end surface of the first tool, the softened workpiece is pressed within the concave groove. The superimposed surface of the workpiece is caulked around the pin sunk into the workpiece in the direction opposite to the caulking direction (i.e., the direction from the second tool to the first tool). Consequently, the superimposed surface of the workpiece is caulked greatly in the direction of the junction axis and a caulking action is enhanced. As a result, a junction strength is improved.

In the third step, a plastic flow mainly along the superimposed surface of the workpiece occurs within the workpiece by the rotation of the junction tool. In accordance with the workpiece being pressed within the concave groove of the first tool, a plastic flow in the direction of the junction axis (i.e., the direction perpendicular to the superimposed surface) is accelerated. The workpiece is sufficiently agitated in the direction along the superimposed surface and the direction perpendicular to the superimposed surface. As a result, a junction strength is even further improved.

A junction tool which has an annular convex portion at the distal end surface of the second tool so as to surround the depression may be used.

Thus, in the second step, as described above, the superimposed surface of the softened workpiece is caulked in the direction from the first tool to the second tool by the pin and the depression of the junction tool.

Further, the softened workpiece is pressed in the direction from the second tool to the first tool by the annular convex portion provided at the distal end surface of the second tool. For this reason, the superimposed surface of the workpiece is caulked around the pin sunk into the workpiece in the direction opposite to the caulking direction. Thus, a caulking action is enhanced.

Because the second tool contacts the surface of the workpiece at the distal end of the convex portion protruding from the distal end surface, the area that the second tool contacts the workpiece becomes small. Thus, a pressing force (force per unit area acting upon the workpiece from the first tool) of the portion of the first tool corresponding to the convex portion, i.e., the peripheral portion of the pin becomes large. The range of the plastic flow generated within the workpiece in the third step expands from the vicinity of the center of the first tool toward radially outside, so that the workpiece is agitated over a wide range. As a result, a junction strength is even further improved.

Another junction method of the present invention utilizes a junction tool which is configured by first and second tools placed on a junction axis substantially perpendicular to the superimposed surface of the workpiece while nipping the workpiece therebetween and which has a pin protruding from the distal end surface of the first tool along the junction axis, an annular concave groove formed at the distal end surface so as to surround the pin, a depression depressed at the distal end surface of the second tool along the junction axis and an annular convex portion formed at the distal end surface so as to surround the depression. Further, the junction method comprises a first step of nipping the workpiece with the junction tool in the direction of the junction axis and pressing the same while rotating one or both of the first and second tools about the junction axis so as to sink the distal end portion of the junction tool into the workpiece; a second step of caulking, in the direction of the junction axis, the superimposed surface of the workpiece softened by a friction heat generated by the rotation of the junction tool by the pin and the concave groove of the first tool and the depression and the convex portion of the second tool; a third step of generating plastic flow within the workpiece by the rotation of the junction tool so as to agitate the vicinity of the superimposed surface of the workpiece; and a fourth step of pulling the junction tool from the workpiece.

The junction tool used for the junction method has the pin and the depression. Thus, in the second step, as described above, the superimposed surface of the softened workpiece is caulked in the direction from the first tool to the second tool.

As the annular concave groove is provided at the distal end surface of the first tool and the annular convex portion is provided at the distal end surface of the second tool, the superimposed surface of the workpiece is caulked greatly around the pin sunk into the workpiece in the direction opposite to the caulking direction (the direction from the first tool to the second tool) (i.e., caulked in the direction from the second tool to the first tool). As a result, a caulking action is even further enhanced.

In the third step, a plastic flow along the superimposed surface of the workpiece occurs within the workpiece by the rotation of the junction tool. Further, a plastic flow in the direction perpendicular to the superimposed surface occurs by the concave groove of the first tool and the convex portion of the second tool. As a result, the workpiece is sufficiently agitated.

As the second tool is provided with the convex portion, as described above, a pressing force around the pin of the first tool is increased and thus the range of the plastic flows generated in the third step is expanded. As a result, in accordance with the junction method of the present invention, a junction strength is even further improved.

Even in the case of joining thick plate materials or plate materials with relatively high strength, in accordance with the junction method of the present invention, the workpiece can be sufficiently agitated and a sufficient junction strength can be obtained by caulking the workpiece. Consequently, various types of plate materials can be joined.

A junction tool that the distal end surface of one of the first and second tools has a larger diameter than that of the other of the first and second tools may be used, and in the first to fourth steps, among the first and second tools, one that has a distal end surface with large diameter may be rotated about the junction axis.

In the first step, the rotating tool is pressed against the workpiece so as to be sunk into the workpiece. As the rotating tool has a larger diameter at its distal end surface, the area that the tool contacts the workpiece becomes large. Thus, a pressing force of the tool is reduced and sinking of the tool into the workpiece is suppressed. As a result, a reduction in the thickness of a plate material is suppressed.

In the third step, the area that the rotating tool contacts the workpiece becomes large and thus the amount of heat generated by friction is increased. Thus, the range of the plastic flows within the workpiece is expanded.

Especially when a junction tool in which the distal end surface of the first tool has a larger diameter than that of the distal end surface of the second tool is used, sinking of the first tool with a pin into the workpiece is suppressed. Thus, the amount of sinking of the second tool with a depression into the workpiece is increased. The bottom portion of the depression of the second tool is positioned in the vicinity of the surface of the workpiece. The portion pressed into the depression of the second tool in the second step becomes a protrusion after junction for the workpiece. For this reason, the amount of sinking of the second tool into the workpiece is increased so that the bottom portion of the depression of the second tool is positioned in the vicinity of the surface of the workpiece. As a result, it is possible to prevent the protrusion from being protruded greatly from the surface of the workpiece and the appearance of the joined workpiece is improved. Especially if the distal end of the protrusion is flush with the surface of the workpiece, when another member is mounted to the surface of the workpiece, the another member may not be provided with a relief for the protrusion.

When the distal end surface of a rotating tool has a large diameter, the distal end surface of a tool which is not rotated (irrotational tool) has a relatively small diameter. For this reason, the area that the irrotational tool contacts the workpiece is small, so that the amount of heat radiated via the irrotational tool is reduced. As a result, plastic flow within the workpiece starts early and the range of the plastic flow is expanded.

A junction tool that one of the first and second tools has a large diameter portion which has a larger diameter than that of the distal end surface of the other tool and a small diameter portion which is placed at the distal end side of the tool with respect to the large diameter portion and is smaller in the diameter than the large diameter portion may be used. In the first to fourth steps, among the first and second tools, one with the large and small diameter portions may be rotated about the junction axis.

In the first step, the rotating tool is pressed against the workpiece so as to be sunk into the workpiece. As the rotating tool includes the small diameter portion with a small diameter, the small diameter portion is sunk into the workpiece relatively early. Thus, in the third step, the plastic flow within the workpiece occurs early. By generating the plastic flow relatively early, the workpiece can be sufficiently agitated even in the case of joining thick plate materials or plate materials with relatively high strength.

When the small diameter portion is sunk into the workpiece, then the large diameter portion contacts the surface of the workpiece. As the area that the large diameter portion contacts the workpiece is large, sinking of the tool into the workpiece is suppressed. Thus, a reduction in the thickness of a plate material is suppressed.

In the state that the large diameter portion contacts the surface of the workpiece, the amount of heat generated by friction is increased. Thus, as described above, the range of the plastic flow within the workpiece is expanded and the workpiece is agitated over a wide range.

Especially when the first tool is provided with a large diameter portion which has a larger diameter than that of a distal end surface of the second tool and a small diameter portion which is placed at the distal end side of the tool with respect to the large diameter portion and is smaller in the diameter than the large diameter portion, as described above, sinking of the first tool into the workpiece is suppressed and, at the same time, the amount of sinking of the second tool with a recess into the workpiece is increased and the bottom portion of the recess of the second tool is positioned in the vicinity of the surface of the workpiece. As a result, it is possible to prevent a protrusion from being protruded greatly from the surface of the workpiece after junction.

A junction tool of the present invention is a tool for joining a workpiece made of a plurality of plate materials superimposed in their thickness directions at points.

The junction tool comprises first and second tools that are placed on a junction axis substantially perpendicular to the superimposed surface of the workpiece so as to nip the workpiece, and one or both of the first and second tools being disposed so as to be rotated about the junction axis. The first tool is provided with a pin protruding from its distal end surface along the junction axis, and the second tool is provided with a depression which is depressed at its distal end surface along the junction axis.

When junction is performed for a workpiece by using the junction tool, as described above, as a matter of course, the workpiece is agitated sufficiently. Further, the superimposed surface of the workpiece is caulked in the direction of the junction axis by the pin of the first tool and the depression of the second tool. Thus, a junction strength can be improved.

An annular concave groove may be provided at the distal end surface of the first tool so as to surround the pin. An annular convex portion may be provided at the distal end surface of the second tool so as to surround the depression.

Another junction tool of the present invention comprises first and second tools that are placed on a junction axis substantially perpendicular to the superimposed surface of the workpiece so as to nip the workpiece, and one or both of the first and second tools being disposed so as to be rotated about the junction axis. The first tool is provided with a pin protruding from its distal end surface along the junction axis and an annular concave groove at the distal end surface so as to surround the pin, and the second tool is provided with a depression which is depressed at its distal end surface along the junction axis and an annular convex portion at the distal end surface so as to surround the depression.

When junction is performed for a workpiece by using the junction tool, as described above, the workpiece is agitated in the direction along the superimposed surface and the direction perpendicular to the superimposed surface and caulked greatly in the direction of the junction axis by the pin and the concave groove of the first tool and the depression and the convex portion of the second tool. Thus, a junction strength can be even further improved.

The distal end surface of one of the first and second tools may have a larger diameter than that of the other of the first and second tools.

One of the first and second tools may have a large diameter portion which has a larger diameter than that of the distal end surface of the other tool and a small diameter portion which is placed at the distal end side of the tool with respect to the large diameter portion and is smaller in the diameter than the large diameter portion.

DETAILED DESCRIPTION OF THE INVENTION

EMBODIMENT 1

Figure 1:
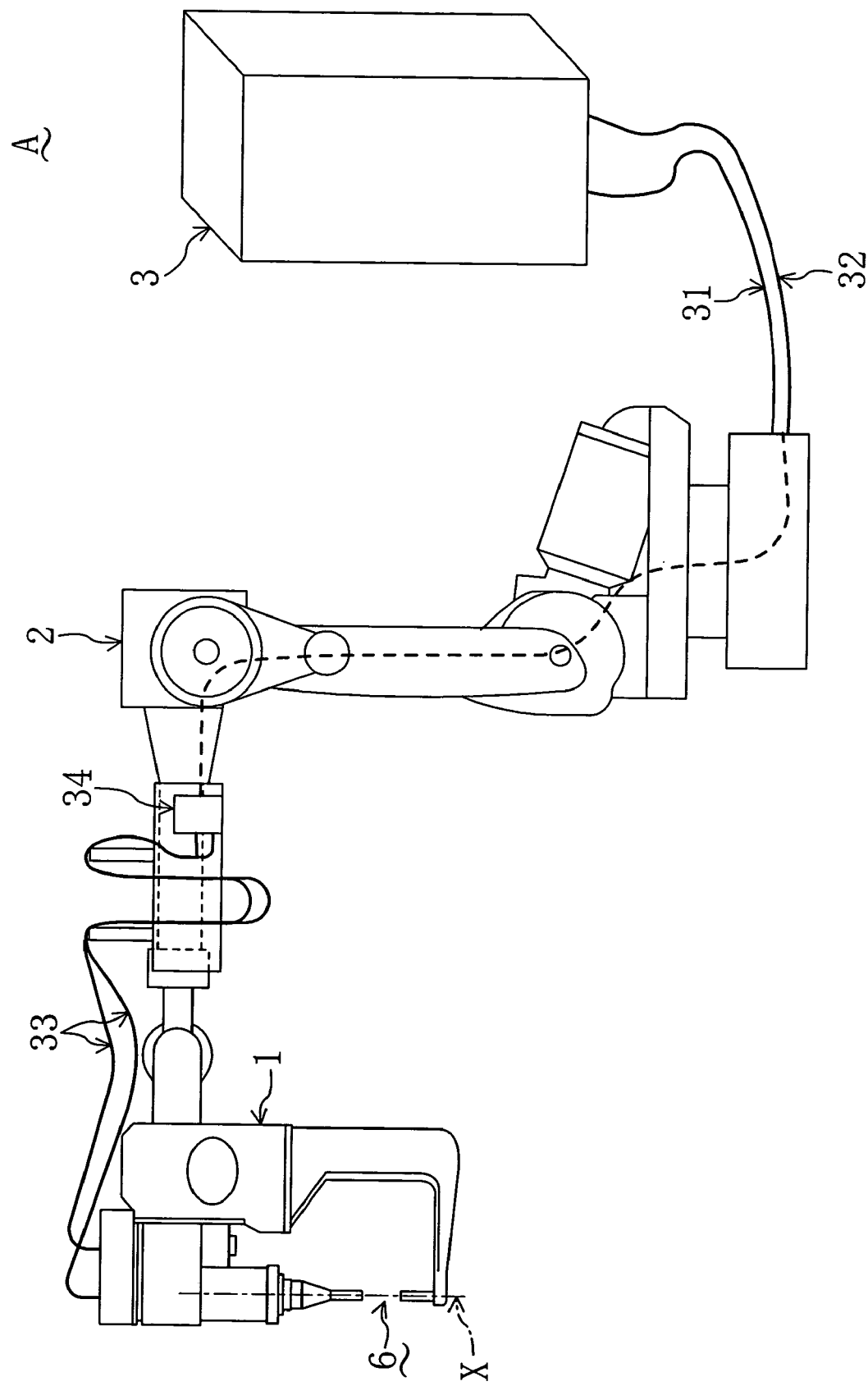
FIG. 1 is a view illustrating the schematic structure of a junction device relating to a first embodiment.

FIG. 1 shows the schematic structure of a junction device A relating to a first embodiment. The junction device A joints, at points, plate materials W1, W2 that are made of aluminum alloys, used for, e.g., a body of an automobile or the like and superimposed in their thickness directions (see FIG. 4).

Figure 4:
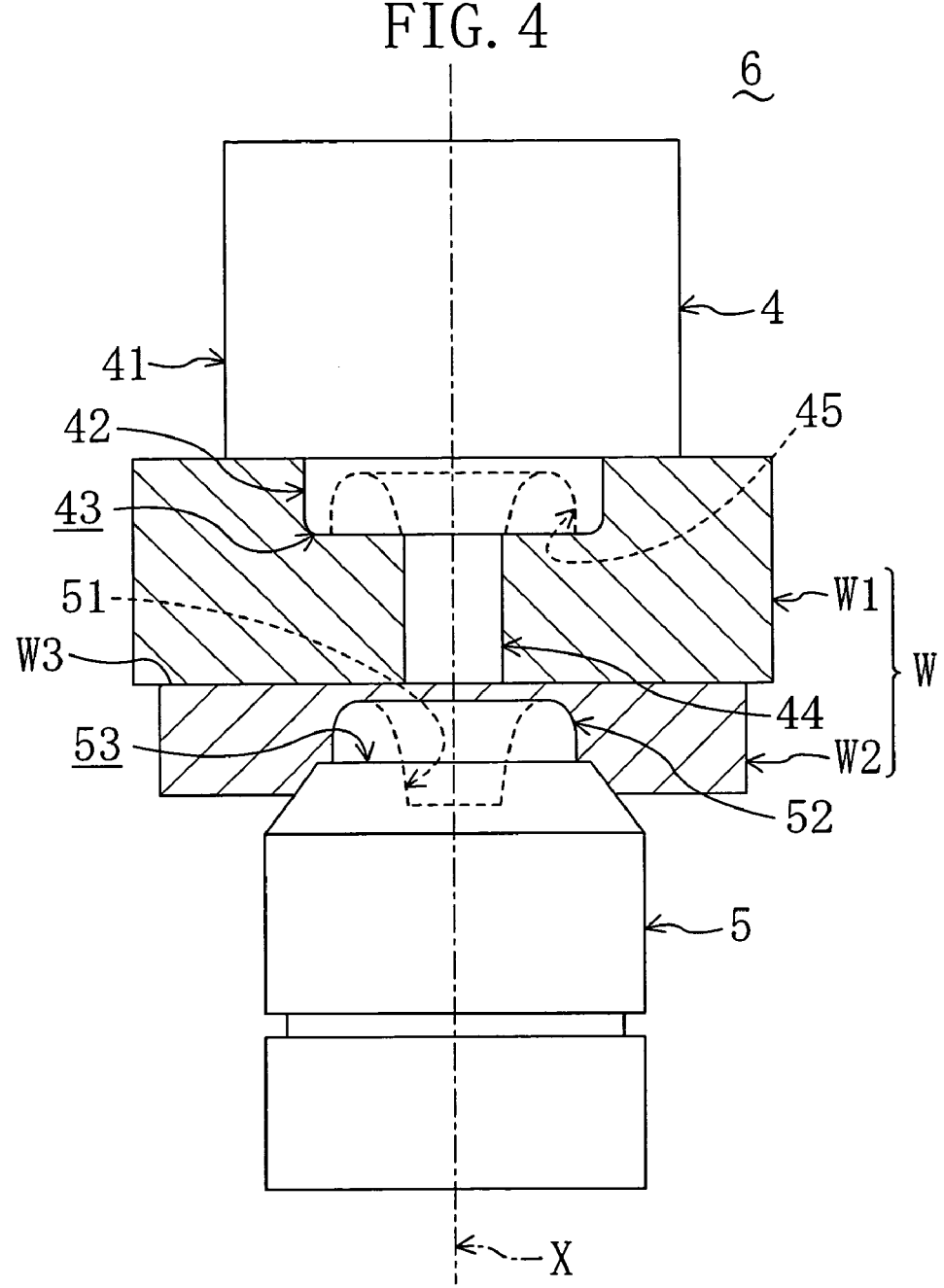
FIG. 4 is a view typically illustrating the junction tool relating to the first embodiment.

The junction device A includes a junction gun 1 for performing junction upon a workpiece W (see FIG. 4). The junction gun 1 is mounted to a wrist of a robot 2. The junction gun 1 is positioned by the robot 2 to a junction position of the workpiece W fixed to an unillustrated jig so as to perform the junction upon the workpiece W.

For example, a general purpose 6-axis vertically articulated robot may be used as the robot 2. The robot 2 is connected to a controlling board 3 by a harness 31. The junction gun 1 is also connected via a relay box 34 provided in the robot 2 to the controlling board 3 by harnesses 32 and 33.

The controlling board 3 is configured so as to synchronously control eight shafts in total, i.e., six shafts of the robot 2 and two shafts for two motors 11 and 12 (see FIG. 2) provided in the junction gun 1 to be described later.

Figure 2:
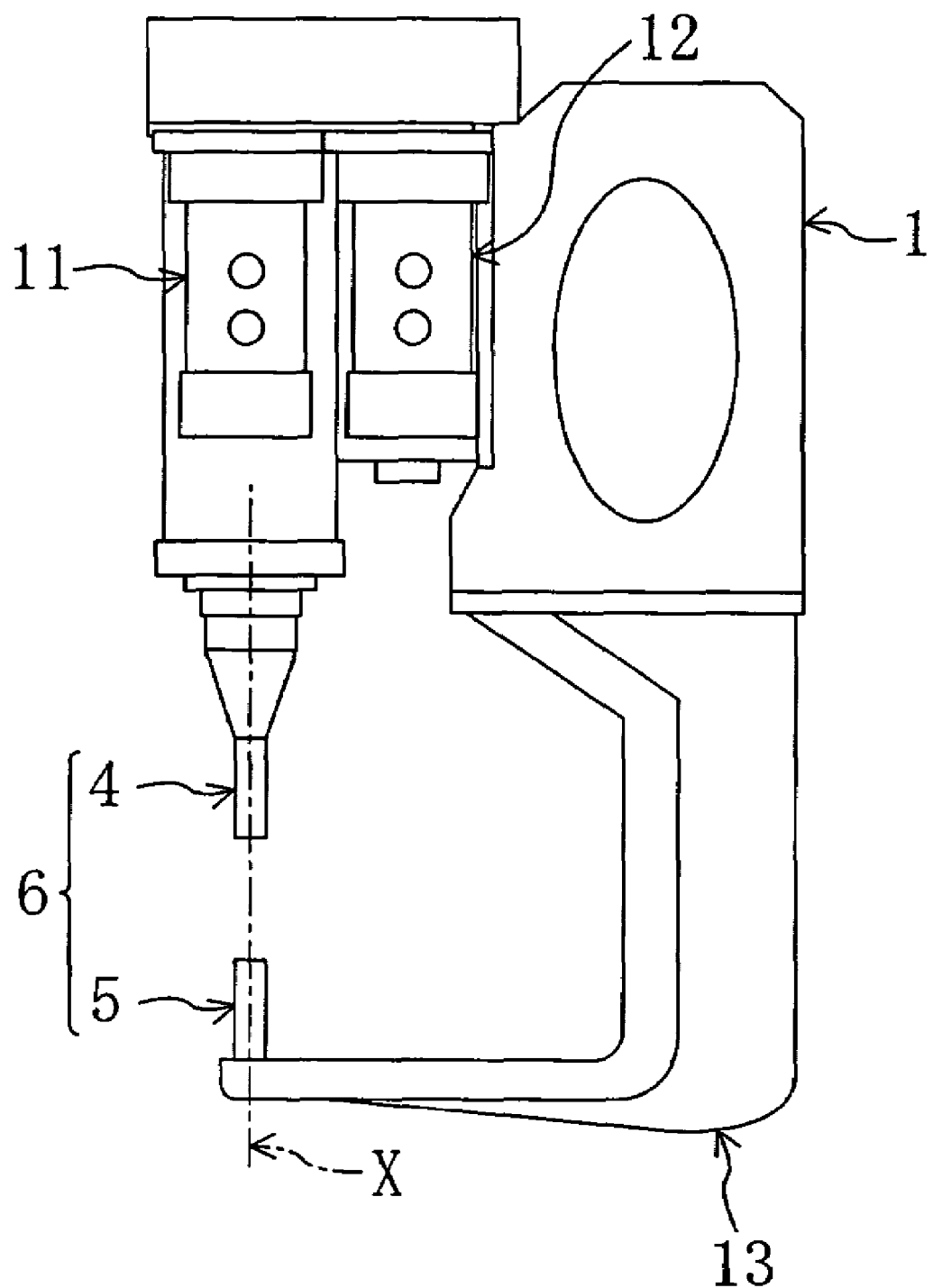
FIG. 2 is a view illustrating the schematic structure of a junction gun.

As shown in FIG. 2, the junction gun 1 includes a junction tool 6 formed of a substantially cylindrical shaped first and second tools 4 and 5.

The first tool 4 is disposed on a junction axis X which is perpendicular to a superimposed surface W3 (see FIG. 4) of the workpiece W obtained by superimposing two plate materials W1 and W2 in their thickness directions. The first tool 4 is rotated about the junction axis X by a rotational shaft motor 11. The first tool 4 is moved upward and downward along the junction axis X by a press shaft motor 12. An induction motor or a servo motor may be used as the rotational shaft motor 11. A servo motor may be used as the press shaft motor 12.

The second tool 5 is mounted to the distal end of a substantially L-shaped arm 13. The second tool 5 is disposed on the junction axis X so as to oppose the first tool 4.

The first and second tools 4 and 5 respectively are mounted to the junction gun 1 so as to be detached therefrom.

Configurations of the distal end portions of the first and second tools 4 and 5 will be described in detail with reference to FIG. 3.

The distal end portion of the first tool 4 has a large diameter portion 41 which has a larger diameter than that of a distal end surface 53 of the second tool 5 and a small diameter portion 42 which is placed at the distal end side of the tool with respect to the large diameter portion 41 and has a smaller diameter than that of the large diameter portion 41. An edge portion 46 of the small diameter portion 42 is rounded in order to prevent concentration of stress of the joined workpiece W, as described later. Other edge portions of the first tool 4 are also rounded configuration.

The first tool 4 is provided with a pin 44 which protrudes from a distal end surface 43 of the small diameter portion 42 along the junction axis X. An inverse thread is provided on the peripheral surface of the pin 44.

An annular concave groove 45 is formed at the distal end surface 43 of the first tool 4 so as to surround the pin 44. Surfaces within the concave groove 45 are smoothed.

A depression 51 which is depressed from the distal end surface 53 along the junction axis X is formed at the second tool 5. The depression 51 is formed in a tapered configuration so that its diameter increases from its bottom portion to its distal end opening portion. The inner peripheral surface of the depression 51 is smoothed.

An annular convex portion 52 is formed at the distal end surface 53 of the second tool 5 so as to surround the depression 51. The convex portion 52 is formed so that its cross-sectional configuration is made thin toward its distal end. Further, the convex portion 52 is formed roundly. Thus, the second tool 5 is easily sunk into the workpiece W and concentration of stress of the joined workpiece W can be prevented.

A junction method for the workpiece W by the junction device A will be described. Firstly, the workpiece W is fixed by an unillustrated jig. The junction gun 1 is positioned by the robot 2 to a predetermined junction position on the workpiece W. Specifically, the workpiece W is placed between the first and second tools 4 and 5 of the junction gun 1. The junction position on the workpiece W is positioned on the junction axis X. The distal end of the second tool 5 is abutted against the bottom surface of the workpiece W.

Then, the junction is performed for the workpiece W by the junction gun 1 as described later. When the junction of the workpiece W is completed, the junction gun 1 is positioned by the robot 2 to the next junction position. In this way, the junction is successively performed upon the predetermined junction positions set on the workpiece W. At the time of the junction of the workpiece W, the arm 13 of the junction gun 1 is deflected. For this reason, the position of the distal end of the second tool 5 mounted to the arm 13 is corrected by controlling the robot 2. A conventional control logic (e.g., performed in a resistance welding using a welding gun) may be applied to such positional correction.

Figure 5:
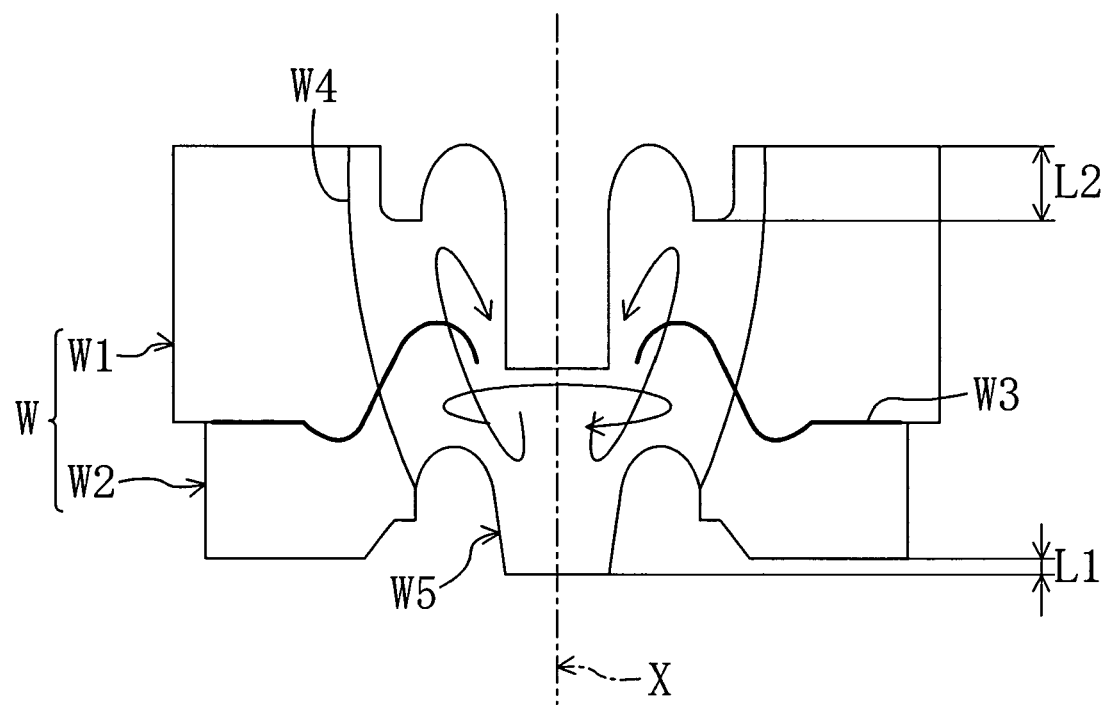
FIG. 5 is an explanatory view illustrating the state of a workpiece in the case that junction is performed by the junction tool relating to the first embodiment.

Next, a junction procedure for the workpiece W by the junction gun 1 will be described with reference to FIGS. 4 and 5. FIG. 4 typically illustrates a junction tool 6 shown in FIG. 3. In FIG. 4, the same members as those of FIG. 3 are denoted by the same reference numerals. FIG. 5 typically illustrates the junction portion of the workpiece W joined by the junction tool 6 shown in FIG. 4.

The first tool 4 is rotated about the junction axis X by the rotational shaft motor 11 of the junction gun 1. When the number of revolutions of the first tool 4 reaches a target number of revolutions, the first tool 4 is moved downward by the press shaft motor 12 while being rotated. The workpiece W is nipped by the first and second tools 4 and 5 and pressed in the direction of the junction axis X. The pin 44 of the first tool 4 is sunk into the workpiece W.

Under this state, the first tool 4 continues to be rotated and the workpiece W continues to be pressed. Thus, a heat is generated by cutting the workpiece W around the pin 44. Further, a heat is generated by a friction of the distal end surface 43 of the small diameter portion 42 of the first tool 4 and the surface of the workpiece W.

Because the distal end of the convex portion 52 of the second tool 5 abuts against the bottom surface of the workpiece W, the area where the second tool 5 contacts the workpiece W is extremely small. Thus, an amount of radiation through the second tool 5 is reduced. As a result, the workpiece W is softened relatively early. Then, the small diameter portion 42 of the first tool 4 is sunk into the softened workpiece W.

By the small diameter portion 42 of the first tool 4 sunk into the workpiece W, the pin 44 of the first tool 4 presses the softened workpiece W into the depression 51 of the second tool 5, so that the superimposed surface W3 of the workpiece W is caulked in the direction of the junction axis X (see FIG. 5).

The depression 51 of the second tool 5 is formed in a tapered configuration so that its diameter increases toward its distal end opening. For this reason, even if the arm 13 of the junction gun 1 is deflected and thus the central axis of the depression 51 of the second tool 5 is tilted with respect to the junction axis X at the time of pressing the workpiece W, it is possible to prevent the central axis (junction axis X) of the pin 44 of the first tool 4 from being out of the distal end opening of the depression 51. As a result, the superimposed surface W3 of the workpiece W can be reliably caulked.

As the concave groove 45 is formed in the first tool 4, the softened workpiece W is pressed within the concave groove 45. Further, as the convex portion 52 is formed in the second tool 5, the workpiece W is pressed upward along the direction of the junction axis X.

In this way, the superimposed surface W3 of the workpiece W is caulked in the direction opposite to the aforementioned caulking direction (i.e., in the direction from the second tool 5 to the first tool 4) around the pin 44 sunk into the workpiece W. The superimposed surface W3 of the workpiece W is even further caulked (see FIG. 5).

While the pin 44 and the small diameter portion 42 of the first tool 4 being sunk into the workpiece W, the first tool 4 continues to be rotated and pressed. Then, plastic flow occurs within the workpiece W. A plastic flow generated by the rotation of the first tool 4 is mainly along the superimposed surface W3. As the superimposed surface W3 of the workpiece W is caulked by the pin 44 and the concave groove 45 of the first tool 4 and the depression 51 and the convex portion 52 of the second tool 5, a plastic flow along the junction axis X is also generated (see the arrows in FIG. 5). As a result, the vicinity of the superimposed surface W3 of the workpiece W is agitated in the direction along the superimposed surface W3 and the direction of the junction axis X (i.e., direction perpendicular to the superimposed surface W3).

The inverse thread is formed at the peripheral surface of the pin 44 of the first tool 4. Thus, the agitation of the workpiece W is even further accelerated.

Further, the first tool 4 continues to be rotated and pressed, so that the range W4 of the plastic flow within the workpiece W is expanded.

The first tool 4 abuts the surface of the workpiece W at its large diameter portion 41. Because the large diameter portion 41 has a relatively large diameter, the area where the large diameter portion 41 of the first tool 4 contacts the surface of the workpiece W is relatively large. Thus, the amount of heat generated is increased and the range W4 of plastic flow within the workpiece W is expanded within a short time.

As the area where the large diameter portion 41 of the first tool 4 contacts the surface of the workpiece W is large, a pressing force of the first tool 4 (i.e., a force per unit area acting upon the workpiece W from the first tool 4) is reduced. As a result, sinking of the first tool 4 into the workpiece W can be suppressed and a reduction in the thickness of the workpiece W (plate material W1) can be suppressed (see L2 in FIG. 5).

Further, sinking of the first tool 4 into the workpiece W is suppressed and thus sinking of the second tool 5 into the workpiece W becomes increased. Then, it is possible to prevent the portion of the workpiece W pressed within the depression 51 of the second tool 5 (i.e., protrusion W5) from being further protruded from the surface of the workpiece W after junction (see L1 in FIG. 5). Consequently, the appearance of the workpiece W after junction is improved.

In this way, the agitation within the workpiece W continues for a predetermined period of time and then the first tool 4 is moved upward by the press shaft motor 12 while being rotated. Thus, the first tool 4 (and the second tool 5) are pulled from the workpiece W. As the inner peripheral surfaces of the concave groove 45 in the first tool 4 and the depression 51 in the second tool 5 are smoothed, the workpiece W does not adhere to such surfaces. Thus, it is possible to prevent the workpiece W from being torn when the junction tool 6 is pulled therefrom.

Thereafter, the workpiece W is cooled rapidly and thus cured. In this way, the junction for the workpiece W has been completed.

In the junction portion of the workpiece W joined as described above, the edge portion 46 of the small diameter portion 42 of the first tool 4 is rounded and thus the portion of the workpiece W corresponding to this edge portion becomes smooth. As a result, it is possible to prevent concentration of stress of the junction portion.

As described above, in accordance with the junction method relating to the first embodiment, the pin 44 is provided in the first tool 4 of the junction tool 6 and the depression 51 is provided in the second tool 2 thereof. Thus, the superimposed surface W3 of the workpiece W can be caulked in the direction along the junction axis X. Further, the concave groove 45 is provided around the pin 44 of the first tool 4 and the convex portion 52 is provided at the peripheral edge of the depression 51 of the second tool 5. Accordingly, the superimposed surface W3 of the workpiece W can be even further caulked in the direction along the junction axis X.

By the pin 44 and the concave groove 45 in the first tool 4 and the depression 51 and the convex portion 52 in the second tool 5, plastic flows can be generated within the workpiece W in the direction along the superimposed surface W3 and in the direction perpendicular to the superimposed surface W3, so that the workpiece W can be agitated sufficiently.

In accordance with the junction method relating to the first embodiment, the junction of the workpiece W is carried out by performing the agitation within the workpiece W and the caulking of the superimposed surface W3 of the workpiece W in a composite manner. Thus, a junction strength can be significantly improved as compared to conventional cases.

Even in the case of joining thick plate materials or plate materials with relatively high strength, in accordance with the junction method relating to the first embodiment, the agitation within the workpiece W is performed sufficiently and the superimposed surface W3 of the workpiece W is caulked, so that a sufficient junction strength can be obtained. Especially, sinking of the first tool 4 into the workpiece W is suppressed because the first tool 4 is provided with the large and small diameter portions 41 and 42. Thus, a reduction in the thickness of the plate material W1 can be suppressed even in the case of joining thick plate materials.

MODIFIED EXAMPLE 1

Figure 6:
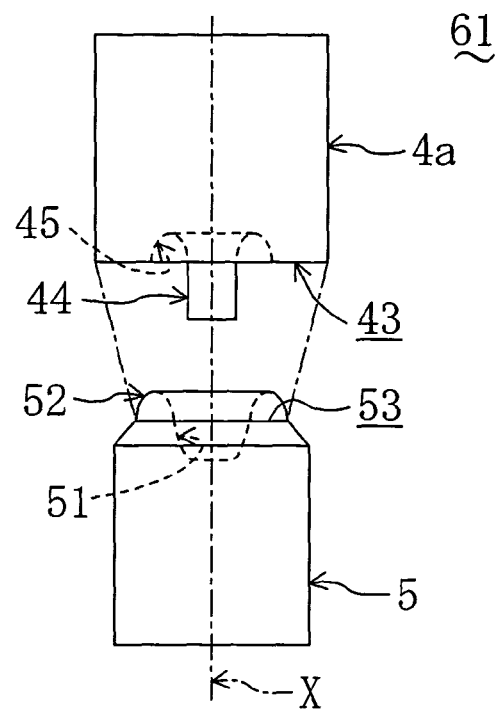
FIG. 6 is a view illustrating a junction tool relating to a first modified example of the first embodiment.

In accordance with the junction tool 6 relating to the first embodiment, the first tool 4 has the large diameter portion 41 and the small diameter portion 42. In accordance with a junction tool 61 relating to a first modified example, as shown in FIG. 6, a first tool 4a does not have the small diameter portion 42. The distal end surface 43 of the first tool 4a has a larger diameter than the distal end surface 53 of the second tool 5. The first tool 4a is provided with the pin 44 protruding from the distal end surface 43 along the junction axis X and the annular concave groove 45 surrounding the pin 44.

The second tool 5 of the junction tool 61 relating to the first modified example is the same as the second tool 5 relating to the first embodiment. The second tool 5 relating to the first modified example is provided with the depression 51 which is depressed at the distal end surface 53 along the junction axis X and the annular convex portion 52 surrounding the depression 51.

When junction for the workpiece W is performed by using the junction tool 61 relating to the first modified example, the superimposed surface W3 of the workpiece W can be sufficiently caulked along the junction axis X by the pin 44 of the first tool 4a and the depression 51 of the second tool 5, and the concave groove 45 of the first tool 4a and the convex portion 52 of the second tool 5. Further, plastic flows occur within the workpiece W along the direction of the superimposed surface W3 and the direction perpendicular to the superimposed surface W3, so that the workpiece W can be sufficiently agitated. In this way, a junction strength can be improved.

Because the distal end surface of the first tool 4a has a large diameter, sinking of the first tool 4a into the workpiece W at the time of junction can be suppressed. Thus, a reduction in the thickness of the workpiece W (plate material W1) can be suppressed (see L2 in FIG. 5). Further, as the second tool 5 is greatly sunk into the workpiece W, the protrusion W5 can be prevented from being protruded greatly from the surface of the workpiece W after junction (see L1 in FIG. 5).

In the case of the junction with the junction tool 61 relating to the first modified example, sinking of the first tool 4a is suppressed at the time when the pin 44 of the first tool 4a is sunk into the workpiece W. Thus, it takes a long time for plastic flows to be generated within the workpiece W, so that the time required for junction becomes long.

MODIFIED EXAMPLE 2

Figure 7:
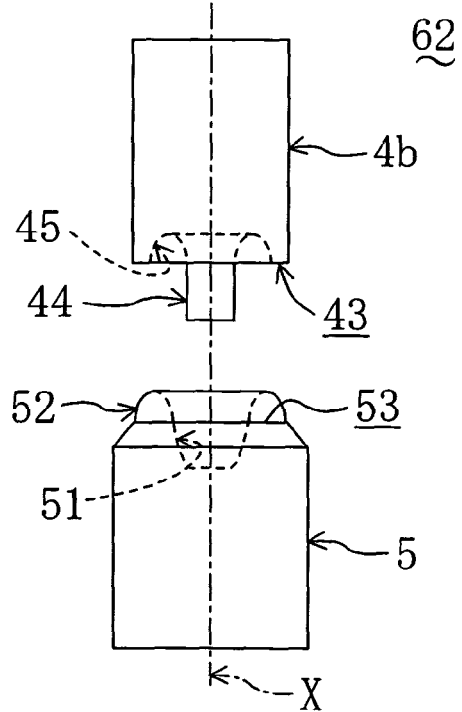
FIG. 7 is a view illustrating a junction tool relating to a second modified example of the first embodiment.

In accordance with a junction tool 62 relating to a second modified example, as shown in FIG. 7, the distal end surface 43 of a first tool 4b has a relatively small diameter. Specifically, the distal end surface 43 of the first tool 4b relating to the second modified example is set so as to have substantially the same diameter as that of the distal end surface 53 of the second tool 5. The first tool 4b is also provided with the pin 44 protruding from the distal end surface 43 along the junction axis X and the annular concave groove 45 surrounding the pin 44.

The second tool 5 of the junction tool 62 relating to the second modified example is the same as the second tool 5 relating to the first embodiment. The second tool 5 relating to the second modified example is provided with the depression 51 which is depressed at the distal end surface 53 along the junction axis X and the annular convex portion 52 surrounding the depression 51.

When junction for the workpiece W is performed by using the junction tool 62 relating to the second modified example, the superimposed surface W3 of the workpiece W can be sufficiently caulked along the junction axis X by the pin 44 of the first tool 4b and the depression 51 of the second tool 5, and the concave groove 45 of the first tool 4b and the convex portion 52 of the second tool 5. Further, plastic flows occur within the workpiece W along the direction of the superimposed surface W3 and the direction perpendicular to the superimposed surface W3, so that the workpiece W can be sufficiently agitated.

When the junction starts, the distal end of the convex portion 52 of the second tool 5 abuts against the bottom surface of the workpiece W. Thus, a pressing force becomes large at the portion of the distal end surface 43 of the first tool 4b corresponding to the convex portion 52 (i.e., at the peripheral portion of the pin 44). For this reason, the range W4 of plastic flow within the workpiece W can be expanded from the vicinity of the center of the first tool 4b toward radially outside.

Because the distal end surface 43 of the first tool 4b in the junction tool 62 relating to the modified example 2 has a relatively small diameter, the amount of sinking of the first tool 4b into the workpiece W may be increased. Thus, the thickness of the plate material W1 may be reduced and the amount of sinking of the second tool 5 may be decreased. As a result, the protrusion W5 may be protruded greatly from the surface of the workpiece W.

EMBODIMENT 2

Figure 8:
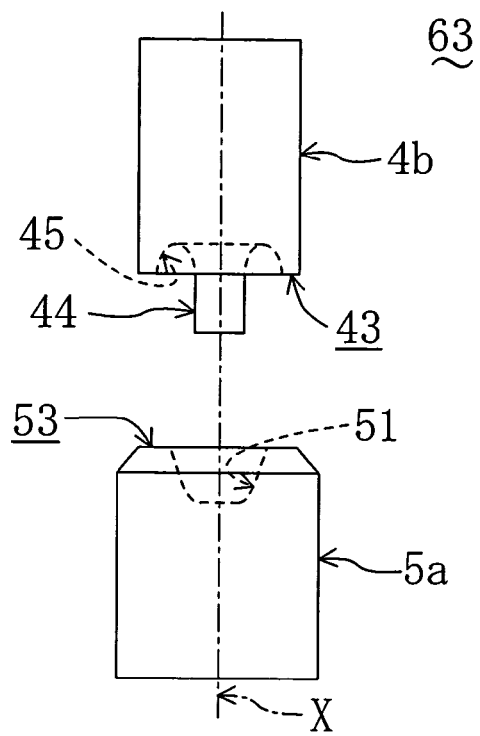
FIG. 8 is a view illustrating a junction tool relating to a second embodiment.

In accordance with a junction tool 63 relating to a second embodiment, as shown in FIG. 8, the first tool 4b is the same as the first tool relating to the second modified example in the first embodiment. The distal end surface 43 of the first tool 4b is set to have substantially the same diameter as that of the distal end surface 53 of the second tool 5. The first tool 4b is provided with the pin 44 protruding from the distal end surface 43 along the junction axis X and the annular concave groove 45 surrounding the pin 44.

A second tool 5a of the junction tool 63 relating to the second embodiment is provided with the depression 51 which is depressed at the distal end surface 53 along the junction axis X but not with the annular convex portion 52.

When junction is performed for the workpiece W by using the junction tool 63 relating to the second embodiment, the superimposed surface W3 of the workpiece W can be caulked in the direction of the junction axis X by the pin 44 of the first tool 4b and the depression 51 of the second tool 5a. Further, the softened workpiece W is pressed into the concave groove 45 of the first tool 4b and thus the superimposed surface W3 of the workpiece W can be even further caulked.

Plastic flows can be generated within the workpiece W in the direction along the superimposed surface W3 and in the direction perpendicular to the superimposed surface W3. Consequently, a junction strength can be improved as compared to conventional cases.

Here, in accordance with the junction tool 63 relating to the second embodiment, the convex portion 52 is not provided in the second tool 5a. Thus, a caulking action may be degraded as compared to the case of joining the workpiece W by using the junction tool 6 relating to the first embodiment.

The plastic flow in the direction perpendicular to the superimposed surface W3 may be weakened as compared to the case of joining the workpiece W by using the junction tool 6 relating to the first embodiment.

In the junction tool 63 relating to the second embodiment, the first tool 4b may be configured so as to have the large and small diameter portions 41 and 42 as in the first embodiment. Alternatively, as in the first modified example in the first embodiment, the diameter of the distal end surface 43 of the first tool 4b may be larger than that of the distal end surface 53 of the second tool 5a.

EMBODIMENT 3

Figure 9:
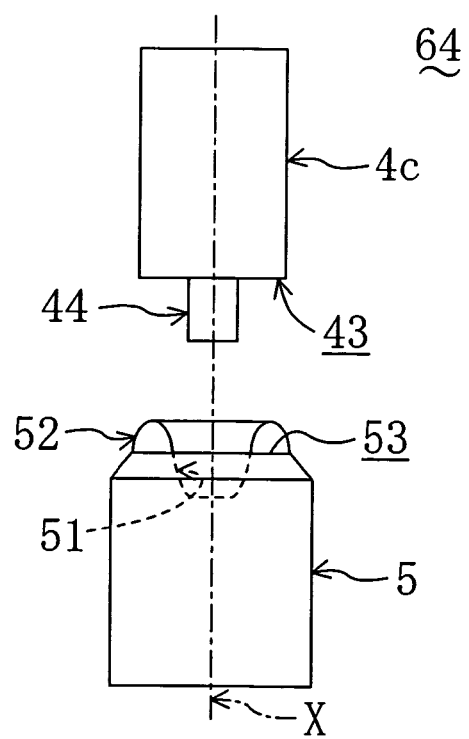
FIG. 9 is a view illustrating a junction tool relating to a third embodiment.

In accordance with a junction tool 64 relating to a third embodiment, as shown in FIG. 9, a first tool 4c is provided with the pin 44 protruding from the distal end surface 43 along the junction axis X but not with the annular concave groove 45.

The second tool 5 of the junction tool 64 relating to the third embodiment is the same as the second tool 5 relating to the first embodiment. The second tool 5 is provided with the depression 51 which is depressed at the distal end surface 53 along the junction axis X and the annular convex portion 52 surrounding the depression 51.

When junction is performed for the workpiece W by using the junction tool 64 relating to the third embodiment, the superimposed surface W3 of the workpiece W can be caulked in the direction of the junction axis X by the pin 44 of the first tool 4c and the depression 51 of the second tool 5. Further, the softened workpiece W is pressed upward by the convex portion 52 of the second tool 5 and thus the superimposed surface W3 of the workpiece W can be even further caulked.

Plastic flows can be generated within the workpiece W in the direction along the superimposed surface W3 and the direction perpendicular to the superimposed surface W3. Consequently, a junction strength can be improved as compared to conventional cases.

Because the concave groove 45 is not provided at the first tool 4c in the junction tool 64 relating to the third embodiment, when the junction is performed for the workpiece W by using the junction tool 64, a caulking action may be slightly degraded.

The plastic flow in the direction perpendicular to the superimposed surface W3 is weakened as compared to the case of joining the workpiece W by using the junction tool 6 relating to the first embodiment.

In the junction tool 64 relating to the third embodiment, the first tool 4c may be configured so as to have the large and small diameter portions 41 and 42 as in the first embodiment. Alternatively, as in the first modified example in the first embodiment, the diameter of the distal end surface 43 of the first tool 4c may be larger than that of the distal end surface 53 of the second tool 5.

EMBODIMENT 4

Figure 10:
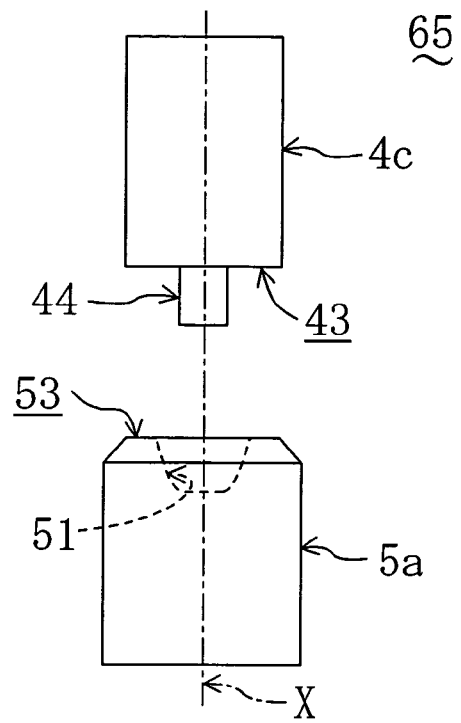
FIG. 10 is a view illustrating a junction tool relating to a fourth embodiment.

In accordance with a junction tool 65 relating to a fourth embodiment, as shown in FIG. 10, a first tool 4c is the same as the first tool 4c relating to the third embodiment. The first tool 4c of the fourth embodiment is provided with the pin 44 protruding from the distal end surface 43 along the junction axis X but not with the annular concave groove 45.

A second tool 5a of the junction tool 65 relating to the fourth embodiment is the same as the second tool relating to the second embodiment. The second tool 5a is provided with the depression 51 which is depressed at the distal end surface 53 along the junction axis X not with the annular convex portion 52.

When junction is performed for the workpiece W by using the junction tool 65 relating to the fourth embodiment, the superimposed surface W3 of the workpiece W can be caulked in the direction of the junction axis X by the pin 44 of the first tool 4c and the depression 51 of the second tool 5a.

Further, plastic flows can be generated within the workpiece W in the direction along the superimposes surface W3 and the direction perpendicular to the superimposed surface W3. Thus, a junction strength can be improved as compared to conventional cases.

In accordance with the junction tool 65 relating to the fourth embodiment, the concave groove 45 is not provided in the first tool 4c and the convex portion 52 is not provided in the second tool 5a. When the junction is performed for the workpiece W by using the junction tool 65, a caulking action may be slightly degraded.

The plastic flow in the direction perpendicular to the superimposed surface W3 is weakened as compared to the case of joining the workpiece W by using the junction tool 6 relating to the first embodiment.

Also in the junction tool 65 relating to the fourth embodiment, the first tool 4c may be configured so as to have the large and small diameter portions 41 and 42 as in the first embodiment. Alternatively, as in the first modified example in the first embodiment, the diameter of the distal end surface 43 of the first tool 4c may be larger than that of the distal end surface 53 of the second tool 5.

EMBODIMENT 5

Figure 11:
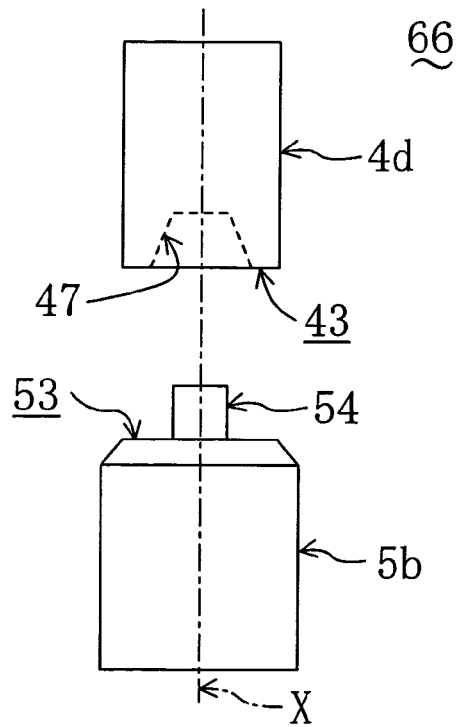
FIG. 11 is a view illustrating a junction tool relating to a fifth embodiment.

In accordance with a junction tool 66 relating to a fifth embodiment, as shown in FIG. 11, the first tool and the second tool of the junction tool 65 relating to the fourth embodiment is counterchanged. Namely, a depression 47 which is depressed at the distal end surface 43 along the junction axis X is formed at the first tool 4d of the junction tool 66 relating to the fifth embodiment.

The second tool 5b of the junction tool 66 relating to the fifth embodiment is provided with the pin 54 protruding from the distal end surface 53 along the junction axis X.

When junction is performed for the workpiece W by using the junction tool 66 relating to the fifth embodiment, the superimposed surface W3 of the workpiece W can be caulked in the direction of the junction axis X by the depression 47 of the first tool 4d and the pin 54 of the second tool 5b.

Further, plastic flows can be generated within the workpiece W in the direction along the superimposed surface W3 and the direction perpendicular to the superimposed surface W3. Thus, a junction strength can be improved as compared to conventional cases.

Also in the junction tool 66 relating to the fifth embodiment, the first tool 4d may be configured so as to have the large and small diameter portions 41 and 42 as in the first embodiment. Alternatively, as in the first modified example in the first embodiment, the diameter of the distal end surface 43 of the first tool 4d may be larger than that of the distal end surface 53 of the second tool 5.

In the junction tools 61 to 65 relating to the first to fourth embodiments, the first tools and the second tools may be counterchanged.

EMBODIMENT 6

Figure 12:
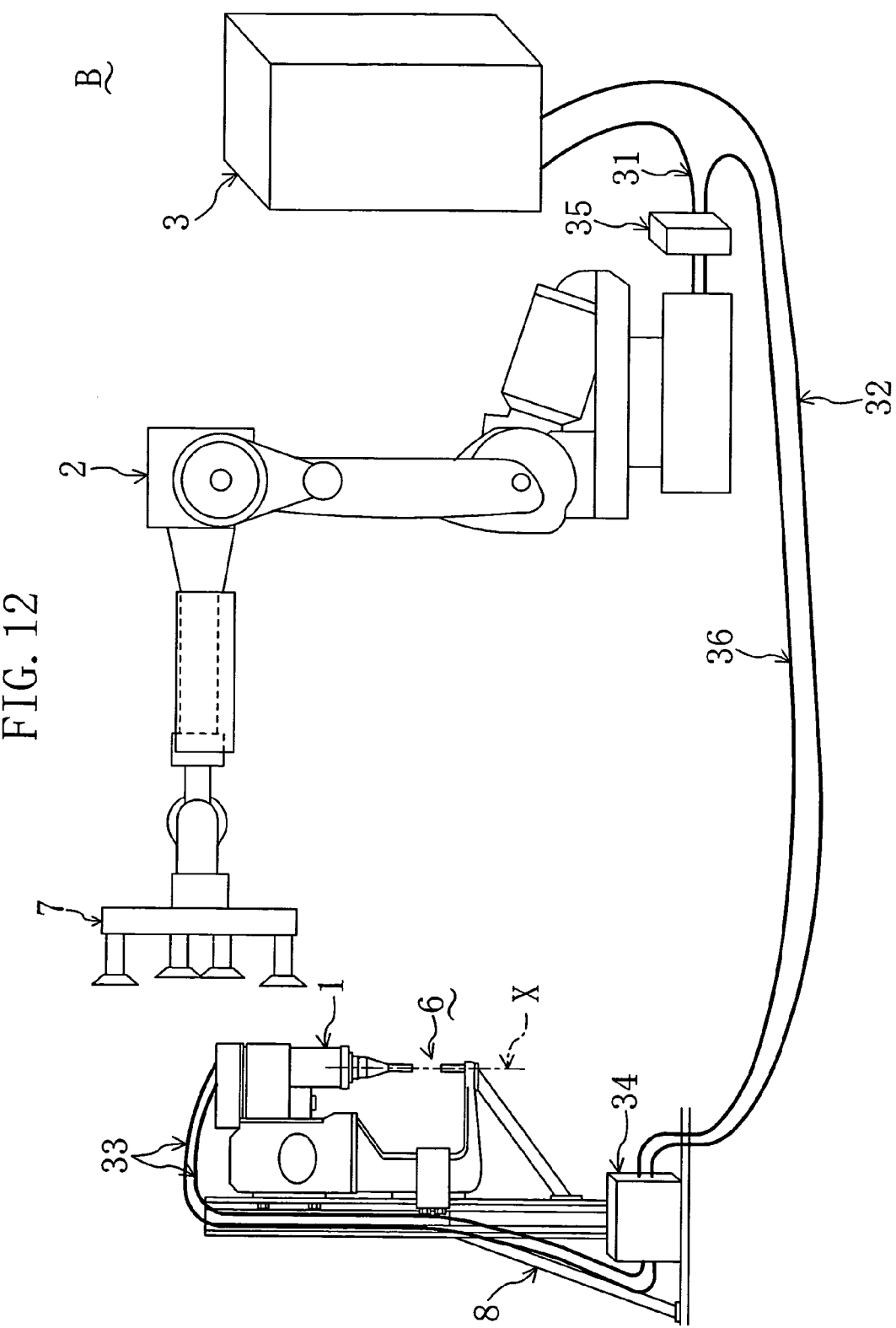
FIG. 12 is a view illustrating the schematic structure of a junction device relating to a sixth embodiment.

A junction device relating to a sixth embodiment is different from that of the first embodiment. Specifically, as shown in FIG. 12, in accordance with a junction device B relating to the sixth embodiment, a handling tool 7 for holding the workpiece W is mounted to the wrist of the robot 2. The junction gun 1 is mounted to a frame 8 which is installed separately from the robot 2.

The robot 2 is connected via a branch box 35 to the controlling board 3 by the harness 31. The junction gun 1 is connected via the harness 33 and the relay box 34 to the branch box 35 and the controlling board 3 by the harnesses 36 and 32, respectively.

When junction is performed for the workpiece W by the junction device B, the workpiece W is held by the handling tool 7 and a predetermined junction position set on the held workpiece W is positioned by the robot 2 between the first and second tools 4 and 5 of the stationary junction gun 1. Then, the junction for the workpiece W is performed by the junction gun 1.

In accordance with the junction device B, the workpiece W is positioned by the robot 2 and thus the precision of the junction position may be degraded as compared to the junction device A relating to the first embodiment. Thus, the junction device B may be used for additional junction in the case where a plurality of junction positions are set on the workpiece W. Junction is performed by the junction device A relating to the first embodiment for, among a plurality of junction positions, junction positions for temporary junction requiring high positional precision and by the junction device B relating to the sixth embodiment for junction positions for additional junction which does not require high positional precision.

OTHER EMBODIMENTS

The present invention is not limited to the above-described embodiments and may include other various embodiments. Although the first tool 4 is rotated but the second tool 5 is not rotated when junction is performed for the workpiece W in accordance with the above-described embodiments, both of the first and second tools 4 and 5 may be rotated.

Although junction is performed for the workpiece W obtained by superimposing two plate materials W1 and W2 in their thickness directions in accordance with the above-described embodiments, junction may be performed for a workpiece W obtained by superimposing three or more plate materials. Namely, in accordance with the present invention, junction may be performed for a workpiece made of three or more plate materials.

EXAMPLES

Specific examples of the junction method relating to the present invention will be described.

Junction was performed for a workpiece W formed of different plate materials by the junction method relating to the present invention (present example) and a conventional junction method (comparative example). Specifically, a plate material of a 5000 series aluminum alloy (with a thickness of 1.0 mm) and a plate material of a 6000 series aluminum alloy (with a thickness of 2.0 mm) were joined.

Figure 3:
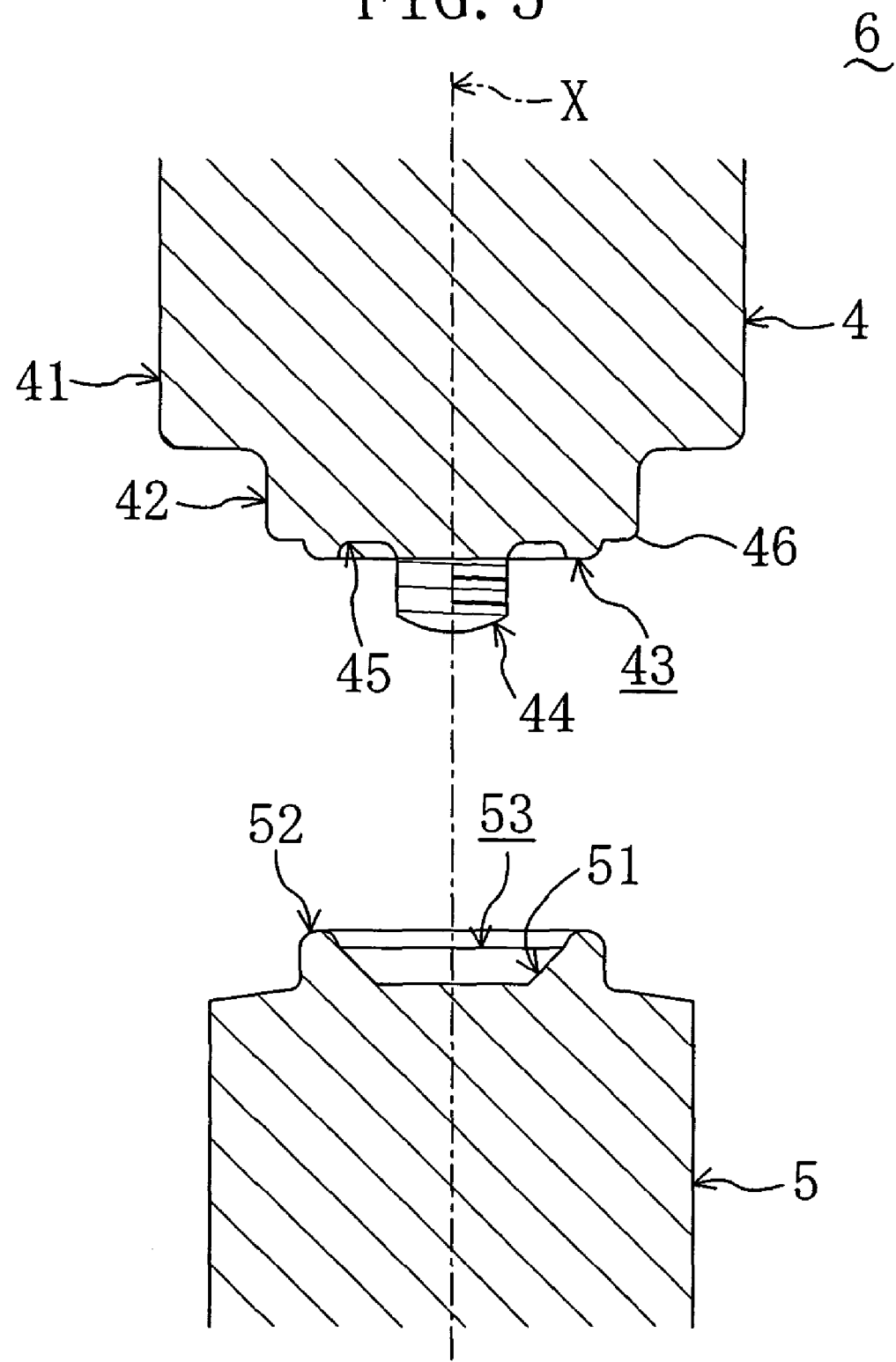
FIG. 3 is a cross-sectional view illustrating the distal end portion of a junction tool relating to the first embodiment.

In accordance with this example, junction was performed for the workpiece W by the junction tool 6 shown in FIG. 3. On the other hand, in accordance with the comparative example, the junction was performed for the workpiece W by using a junction tool configured by a first tool which is provide with only a pin (not with a concave groove) and a second tool whose distal end surface is flat (a depression and a convex portion were not formed).

Figure 13:
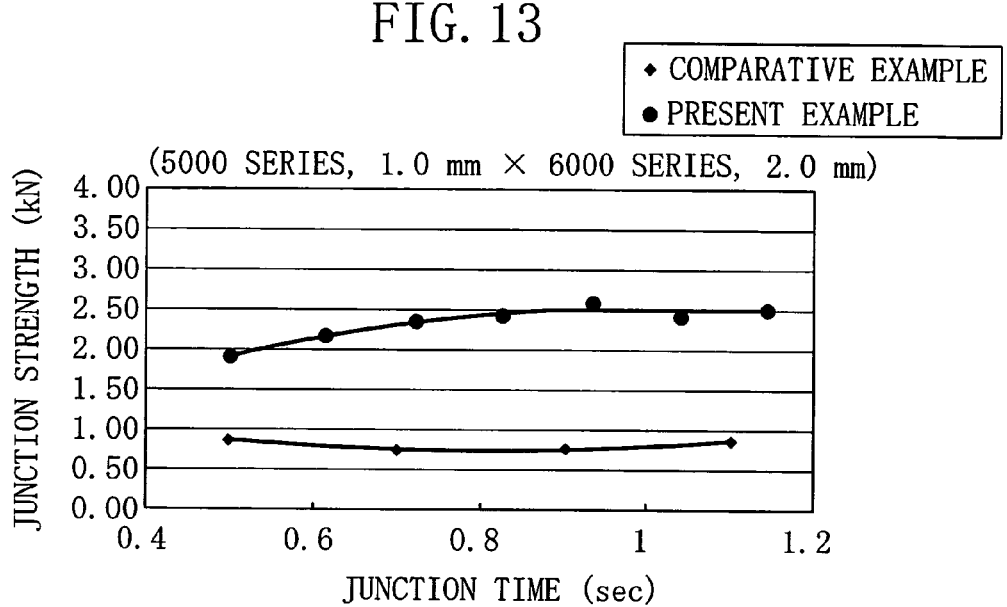
FIG. 13 is a graph illustrating the result of experiment of a junction strength with respect to a junction time when junction is performed for a workpiece made of different plate materials.

FIG. 13 illustrates the results. In accordance with the comparative example, a junction strength was not increased even though a junction time became long. The junction strength was around 1.00 kN. Namely, a sufficient junction strength could not be obtained in the comparative example. In contrast, in the present example, the junction strength was gradually increased as the junction time was extended. A sufficient junction strength, i.e., about 2.50 kN of the junction strength could be obtained.

Next, junction was performed for a workpiece W made of relatively thick plate materials by the junction method relating to the present invention (present example) and a conventional junction method (comparative example). Specifically, a plate material with a thickness of 2.0 mm (made of a 6000 series aluminum alloy) and a plate material with a thickness of 1.6 mm (made of a 6000 series aluminum alloy) were joined.

In accordance with the present example, the junction was performed for the workpiece W by using the junction tool 6 shown in FIG. 3. In accordance with the comparative example, the junction was performed for the workpiece W by using a junction tool configured by a first tool in which only a pin is formed and a second tool with a flat distal end surface.

Figure 14:
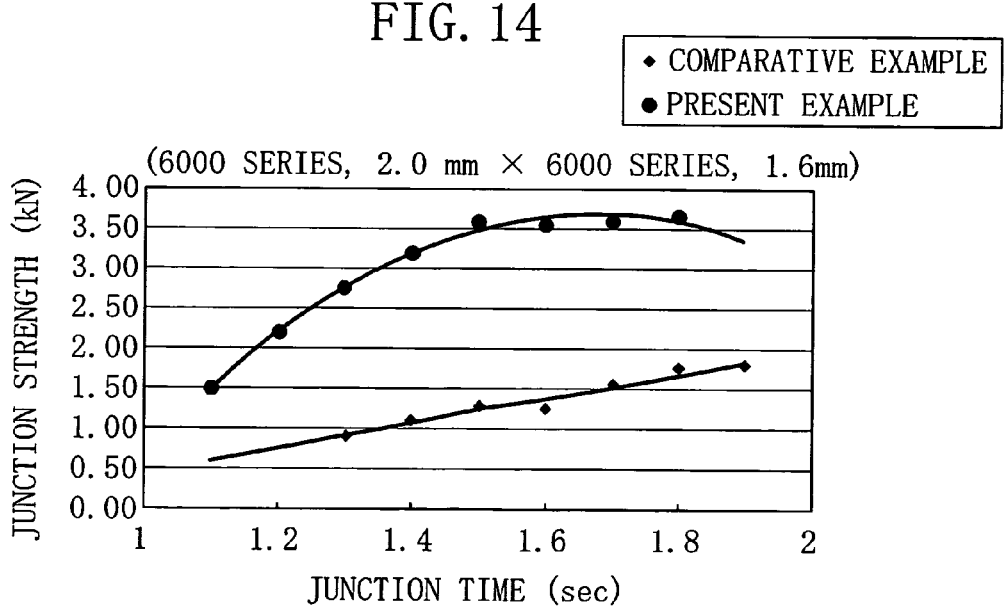
FIG. 14 is a graph illustrating the result of experiment of a junction strength with respect to a junction time when junction is performed for a workpiece made of thick plate materials.

FIG. 14 illustrates the results. In the comparative example, when a junction time was extended, a junction strength was gradually increased and the junction strength of around 2.00 kN at most could be obtained. On the other hand, in accordance with the present example, as compared to the comparative example, higher junction strength could be obtained with the same junction time. Further, an extremely large junction strength, i.e., about 3.70 kN of the junction strength could be obtained in the present example.

What is claimed is:

1. A junction method for joining a workpiece made of a plurality of plate materials superimposed in their thickness directions at points, said method utilizing a junction tool which is configured by first and second tools placed on a junction axis substantially perpendicular to superimposed surfaces of the workpiece while nipping the workpiece therebetween and which has a pin protruding from a distal end surface of the first tool along the junction axis, a recess depressed at a distal end surface of the second tool along the junction axis, and an annular convex portion formed at the distal end surface of the second tool so as to surround the recess, said method comprising:
a first step of nipping the workpiece with the junction tool in the direction of the junction axis and pressing the same while rotating one or both of the first and second tools about the junction axis so as to sink the pin of the first tool and the convex portion of the second tool into the workpiece;
a second step of caulking, in the direction of the junction axis, the superimposed surfaces of the workpiece softened by a friction heat generated by a rotation of the junction tool between the pin of the first tool and the recess of the second tool;
a third step of generating plastic flow within the workpiece by the rotation of the junction tool thereby agitating the vicinity of the superimposed surfaces of the workpiece; and
a fourth step of pulling the junction tool from the workpiece.

2. The junction method of claim 1, wherein the distal end surface of one of the first and second tools of the junction tool has a larger diameter than that of the other of the first and second tools, and
in the first to fourth steps, among the first and second tools, one that has a distal end surface with the larger diameter is rotated about the junction axis.

3. The junction method of claim 1, wherein one of the first and second tools of the junction tool has a large diameter portion which has a larger diameter than that of the distal end surface of the other tool and a small diameter portion which is placed at the distal end side of the tool with respect to the large diameter portion and is smaller in the diameter than the large diameter portion, and
in the first to fourth steps, among the first and second tools, the tool with the large and small diameter portions is rotated about the junction axis.

4. A junction method for joining a workpiece made of a plurality of plate materials superimposed in their thickness directions at points, said method utilizing a junction tool which is configured by first and second tools placed on a junction axis substantially perpendicular to superimposed surfaces of the workpiece while nipping the workpiece therebetween and which has a pin protruding from a distal end surface of the first tool along the junction axis, an annular concave groove formed at the distal end surface so as to surround the pin, a recess depressed at a distal end surface of the second tool along the junction axis and an annular convex portion formed at the distal end surface of the second tool so as to surround the recess, said method comprising:
a first step of nipping the workpiece with the junction tool in the direction of the junction axis and pressing the same while rotating one or both of the first and second tools about the junction axis so as to sink the pin of the first tool and the convex portion of the second tool into the workpiece;
a second step of caulking, in the direction of the junction axis, the superimposed surfaces of the workpiece softened by a friction heat generated by rotation of the junction tool between the pin and the concave groove of the first tool and the recess and the convex portion of the second tool;
a third step of generating plastic flow within the workpiece by the rotation of the junction tool thereby agitating the vicinity of the superimposed surfaces of the workpiece; and
a fourth step of pulling the junction tool from the workpiece.

5. The junction method of claim 4, wherein the distal end surface of one of the first and second tools of the junction tool has a larger diameter than that of the other of the first and second tools, and
in the first to fourth steps, among the first and second tools, one that has a distal end surface with the larger diameter is rotated about the junction axis.

6. The junction method of claim 4, wherein one of the first and second tools of the junction tool has a large diameter portion which has a larger diameter than that of the distal end surface of the other tool and a small diameter portion which is placed at the distal end side of the tool with respect to the large diameter portion and is smaller in the diameter than the large diameter portion, and
in the first to fourth steps, among the first and second tools, the tool with the large and small diameter portions is rotated about the junction axis.

7. A junction device, comprising: a junction tool for joining a workpiece made of a plurality of plate materials superimposed in their thickness directions at points, comprising:
first and second tools that are placed on a junction axis substantially perpendicular to superimposed surfaces of the workpiece so as to nip the workpiece, and one or both of the first and second tools being disposed so as to be rotated about the junction axis, and
a junction tool driving means,
wherein the first tool is provided with a pin protruding from its distal end surface along the junction axis,
the second tool is provided with a recess which is depressed at its distal end surface along the junction axis and an annular convex portion which surrounds the recess, and
the junction tool driving means being configured for
nipping the workpiece with the junction tool in the direction of the junction axis and pressing the same while rotating at least one the first and second tools about the junction axis so as to sink the pin of the first tool and the convex portion of the second tool into the workpiece;
caulking, in the direction of the junction axis, the superimposed surfaces of the workpiece softened by friction heat generated between the pin of the first tool and the recess of the second tool by rotation of the junction tool;
generating plastic flow within the workpiece by the rotation of the junction tool thereby agitating the vicinity of the superimposed surfaces of the workpiece; and
pulling the junction tool from the workpiece.

8. The junction device of claim 7, wherein the distal end surface of one of the first and second tools has a larger diameter than that of the other of the first and second tools.

9. The junction device of claim 7, wherein one of the first and second tools has a large diameter portion which has a larger diameter than that of the distal end surface of the other tool and a small diameter portion which is placed at the distal end side of the tool with respect to the large diameter portion and is smaller in the diameter than the large diameter portion.

10. A junction device, comprising; a junction tool for joining a workpiece made of a plurality of plate materials superimposed in their thickness directions at points, the junction tool comprising:
first and second tools that are placed on a junction axis substantially perpendicular to superimposed surfaces of the workpiece so as to nip the workpiece, and one or both of the first and second tools being disposed so as to be rotated about the junction axis, and
a junction tool driving means,
wherein the first tool is provided with a pin protruding from its distal end surface along the junction axis and an annular concave groove at the distal end surface so as to surround the pin,
the second tool is provided with a recess which is depressed at its distal end surface along the junction axis and an annular convex portion at the distal end surface so as to surround the recess and
the junction tool driving means being configured for:
nipping the workpiece with the junction tool in the direction of the junction axis and pressing the same while rotating at least one of the first and second tools about the junction axis so as to sink the pin of the first tool and the convex portion of the second tool into the workpiece:
caulking, in the direction of the junction axis, the superimposed surfaces of the workpiece softened by friction heat generated between the pin and the concave groove of the first tool and the recess and the convex portion of the second tool by the rotation of the junction tool;
generating plastic flow within the workpiece by the rotation of the junction tool thereby agitating the vicinity of the superimposed surfaces of the workpiece; and
pulling the junction tool from the workpiece.

11. The junction device of claim 10, wherein the distal end surface of one of the first and second tools has a larger diameter than that of the other of the first and second tools.

12. The junction device of claim 10, wherein one of the first and second tools has a large diameter portion which has a larger diameter than that of the distal end surface of the other tool and a small diameter portion which is placed at the distal end side of the tool with respect to the large diameter portion and is smaller in diameter than the large diameter portion.

* * * * *